N. Sawyer,
Brick Machine.

No 7,309.   Patented Apr. 23, 1850.

2 Sheets—Sheet 2.

N. Sawyer,

Brick Machine.

Nº 7,309. Patented Apr. 23, 1850.

UNITED STATES PATENT OFFICE.

NATHAN SAWYER, OF BALTIMORE, MARYLAND.

BRICK-PRESS.

Specification of Letters Patent No. 7,309, dated April 23, 1850.

*To all whom it may concern:*

Be it known that I, NATHAN SAWYER, of Baltimore, in the county of Baltimore and State of Maryland, have invented a certain new and useful Apparatus for the Manufacture of Bricks from Clay, and that the following is a full, clear, and exact description of the principle or character which distinguishes it from all other things before known and of the usual manner of making, modifying, and using the same, reference being had to the accompanying drawing, in which—

Figure 1:
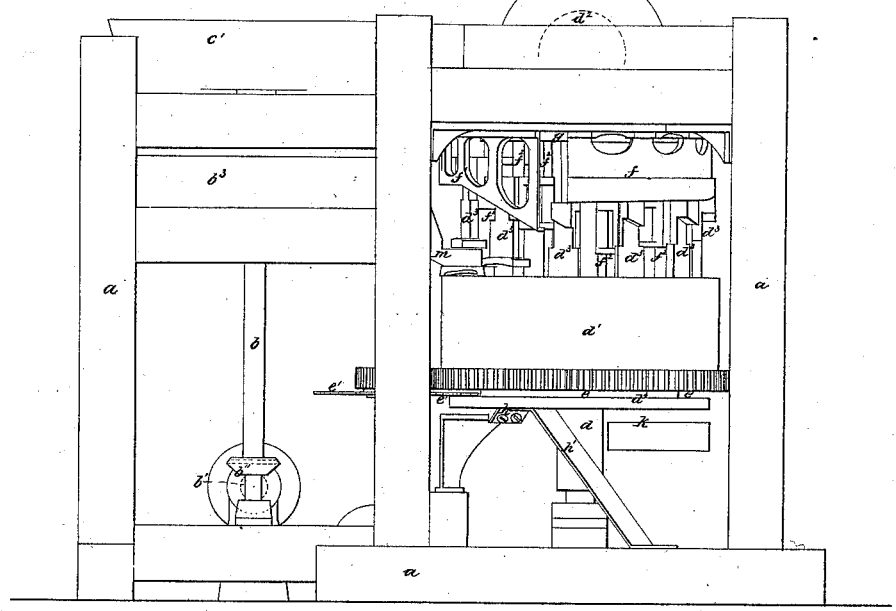
Figure 2:
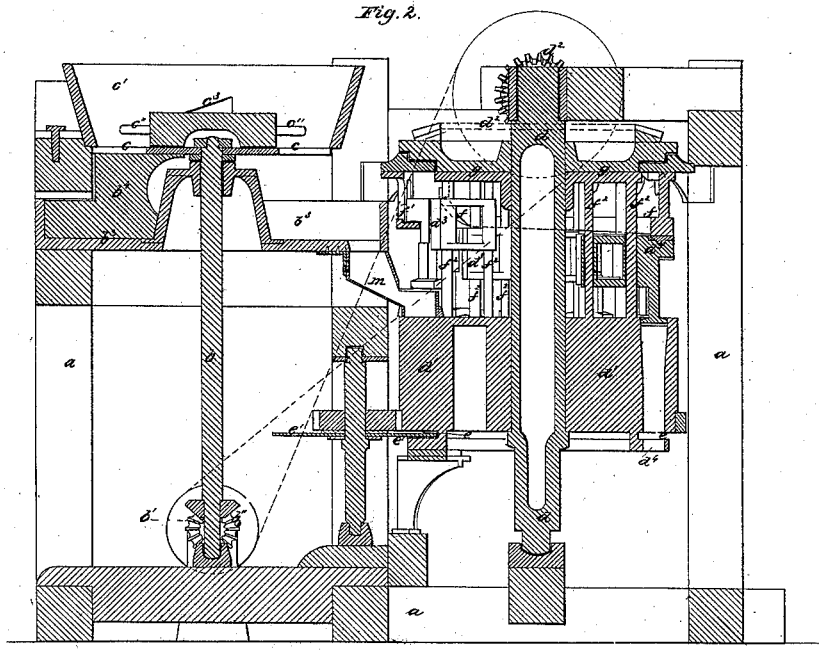
Figure 3:
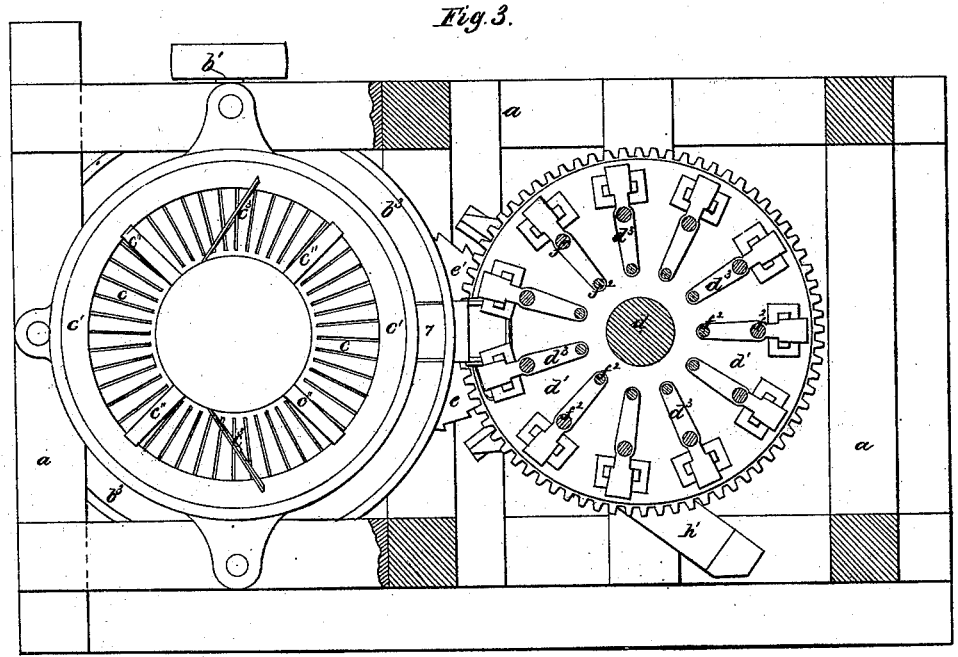
Figure 4:
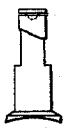

Figure 1, is a side elevation. Fig. 2, is a vertical longitudinal section. Fig. 3, is a top plan with the cam removed to show the molds. Fig. 4, is one of the pistons detached.

This invention consists of a combination of a series of properly formed molds in a revolving cylinder in which pistons are worked as said cylinder revolves against a stationary cam by which the pressure upon the bricks is produced. The peculiar construction of all the parts hereafter described, are essential to the perfect result, and the mode I have devised as shown in the drawing for preparing the clay to form the bricks, I have found efficacious.

The construction of the machine is as follows: I first form a suitable frame ($a$,) of proper proportions for the purpose, near one end of this frame an upright shaft ($b$,) is situated, on upper end of which a flat disk ($c$,) is affixed; this disk has narrow radial openings through it, say about one eighth of an inch in width, extending from near the shaft out to the outer edge which openings may be formed by a succession of grate bars that need not be strictly radial; above the disk a circular hopper ($c'$,) is placed, having cross bars ($c''$) near its lower edge, and scrapers ($c^3$,) that scrape over the disk, and keep the openings clear, which would otherwise become clogged, while revolving. The shaft ($b$,) is turned by the driving shaft ($b'$,) with which it is connected by bevel gear ($b''$,); the operation of this apparatus is to grate or finely pulverize the clay, and fit it to make bricks by the succeeding operations; the clay descends from the disk into a circular receiver ($b^3$,) in which a sweep, ($b^4$) attached to the shaft ($b$), works to carry all the pulverized clay around to a spout, where it is discharged into the molds.

In the center of the main part of the frame there is a large upright shaft ($d$,) upon which there is a short cylinder ($d'$,) in which the molds are located; these molds are rectangular, and of a size at the top about the fourth of an inch longer and broader than the brick is to be when formed; this size is maintained down through the distance the piston moves, say about six inches; it then gradually contracts for a distance of about twelve inches, one eighth of an inch all around, contracting the whole mold one fourth of an inch in its length and breadth down to the size of the brick; at a distance from the bottom of the cylinder equal to the thickness the brick is to be, there is a groove ($e$,) cut into it all around, of a depth sufficient to pass clear through the mold in which groove a revolving cutter ($e'$,) plays, to cut off the bricks from the main body of the clay in the mold. Above the top of the cylinder there is a stationary cam ($f$) firmly fixed to the frame, the face of which, next to the cylinder of molds, is made on an inclination enough to press the brick through, and compress it sufficiently by means of the pistons which bear against the under side; this inclined plane occupies about two thirds of the circumference of the cylinder, more or less, according to the number of molds in the circuit; on the other side, and at the point where the clay is filled into the molds there is a counter cam ($f'$,) for raising the pistons high enough to pass over the spout for filling above spoken of; they then drop, and are brought by the revolution of the molds under the cam; to resist the pressure in making bricks, I have upon the shaft ($d$,) a flat circular casting, ($g$,) the edges of which rest on the cam ($f$,) and move around upon it; this plate is connected with the cylinder ($d'$,) below, by rods or bolts ($f^2$,) that stand just inside the line of molds; these rods or bolts serve not only as connections to resist the strain in pressing, but may be made to serve also as guide rods for the pistons ($d^3$,) as shown in Fig. 2, but the pistons may be guided by other means; the shaft ($d$,) may be turned by bevel gearing ($d^2$,) or in any other convenient way. The circular cutter ($e'$) above referred to, is a circular saw, or compound cutter, geared in any convenient way with the machine, and by its revolution serves to cut off the bricks as they are forced through the upper into the lower section of the mold. It is obvious that stationary cutters could be used instead of the rotary one, and these I have used; but I believe the revolving one to be the best. The compound rotary cutters I propose to form by placing two disks of metal on the cutter shaft, with only space enough between them to admit teeth; thus when the teeth are worn, they can be moved out or renewed at pleasure; but if a solid circular saw was used, when the teeth were worn too short it would have to be removed, and a new one substituted, otherwise the brick would not be cut off. Below the bottom of the cylinder, or that part that contains the brick after it is perfectly pressed, I place a stationary cutter ($h$,) like a plane, which cuts off all the clay that protrudes through below the bottom of the cylinder; to cause this to cut smooth I place in front of it a strong spring ($h'$,) or any equivalent device, as for instance, a lever and weights, which serves as a throat and bears upon the surface of the clay, while cutting; from this point there is a platform, over which the lower surface of the brick passes, till it is cut off by the rotary cutter above. The piston heads that enter the molds are curved or concave on their lower face, for the purpose of causing a sufficient pressure on the ends and corners; or the clay may be scooped out of the center of the mold with a scraper by forming the upper surface of a proper curve for that purpose; these two plans I deem equivalent, and are absolutely essential in working the machine. That part of the piston which works against the cam is formed with a ball and socket joint as shown in Fig. 4 so that the head of the piston shaft at all times conforms to the surface of the cam.

The machine thus constructed is operated as follows: The parts being put into motion by steam or other power, the clay is put into the hopper ($c'$); it thence descends through the grater ($c$,), being pulverized thereby, and is conveyed through the spout or conductor ($m$) into the mold as it passes around under it; in its onward course the clay is compressed properly, and forced forward into the section ($d^4$) of the mold, when it is cut off on both sides, as before explained, and then forced out by the next succeeding brick, and may be received on an endless apron below, shown in red lines at ($k$,) in the drawing. It is obvious that certain modifications of several parts can be made, such for instance as a revolving hopper and stationary disk, for pulverizing the clay, which would be equivalent to the revolving disk and stationary hopper. The stationary cutter, instead of a rotary one, as already mentioned, and scraping out the clay in the center of the mold, instead of making the edges of the piston head concave, and several other parts can be modified, while the principles of construction and operation remain the same.

Having thus fully described my improvements in the manufacture of bricks, what I claim therein as new, and for which I desire to secure Letters Patent, is—

1. The combination of the grated disk and hopper, constructed and arranged substantially in the manner and for the purpose set forth, and in combination with the revolving molds.

2. I do not claim the mold, as herein described, or the manner of holding the brick firmly while being cut off, these claims having already been granted to me in my patent of Sept. 27, 1844; but what I do claim, is the arrangement of the molds, (whether conical or otherwise, as before patented) in a revolving cylinder, with pistons revolving with them, and working under a stationary cam, as herein described, in combination with stationary cutters, or cutters revolving on their own axes, working in a groove near the lower ends of the molds, and also below the molds, in the manner and for the purposes herein set forth.

3. I claim the apparatus for trimming the bricks, consisting of a stationary cutter and a piece in front thereof to press up against the brick as the clay is cut.

4. I claim the combination of adjustable headed pistons, with stationary cam, as herein fully specified.

NATHAN SAWYER.

Witnesses:
BRANTS MAYER,
N. HUDSON,
THOS. CROZALL.